United States Patent Office 2,733,140
Patented Jan. 31, 1956

2,733,140
METHOD FOR THE PRODUCTION OF FERROMANGANESE

Gunnar Brundell, Gavle, and Stig H. Tjernström, Vargon, Sweden, assignors to Wargons Aktiebolag, Vargon, Sweden, a Swedish company No Drawing. Application February 18, 1952, Serial No. 272,250

Claims priority, application Sweden February 28, 1951

7 Claims. (Cl. 75—11)

In the production of ferromanganese in electrical furnaces it is the general opinion that the power consumption under normal conditions is about 3000 kwh. per metric ton of an alloy containing about 80 per cent Mn and about 7 per cent C provided that rich ores, e. g. Indian, Russian or South African ore are used. By using the so-called "rich-slag method," according to which an excess of manganese ore is used, instead of common basic slag forming substances such as lime and dolomite, so that a slag with about 40 per cent manganese is obtained it is possible to decrease the power consumption somewhat e. g. to about 2900 kwh. per metric ton of the alloy.

As an example the following is cited from the best abstract regarding the manufacture of ferromanganese available in Swedish language, viz. Jernkontorets Annaler 1941, No. 8 where on page 355 it is said: "The power consumption has been considerably reduced in later years. In large, modernly equipped furnaces nowadays there is no need for the same to exceed about 3000 kwh. per ton when smelting rich manganese ore charges. Even still lower figures are found in the literature, but since one has always to calculate with considerably higher power consumption when producing ferromanganese than for common pig iron they must be taken with a certain reservation."

In order more closely to analyse the conditions when producing a high-carbon ferromanganese in a 2000 kw. electric furnace of the type normally used for ferro alloys according to the best method hitherto known from the power consumption point of view, viz. the rich-slag method, the following material and power balance has been erected.

Charge:  Percent
280 kgs. manganese ore "A" moisture content__ 6
280 kgs. manganese ore "B" moisture content__ 4
150 kgs. coke-gravel moisture content_____ 20
Ash content _____ 20
counted on dry product.

Production:
13–14 tons high carbon ferromanganese in 24 hours corresponding to 32–35 tons of moist manganese ore.

Power consumption:
2900 kwh. per ton alloy obtained.

Analysis of raw materials and products obtained

|  | Ore A | Ore B | Ash from Coke-gravel | Rich slag | FeMn |
|---|---|---|---|---|---|
|  | Percent | Percent | Percent | Percent | Percent |
| $SiO_2$ | 9.5 | 8.1 | 45 | 28 |  |
| Si |  |  |  |  | 0.8 |
| $Al_2O_3$ | 2.7 |  | 31 | 10 |  |
| $TiO_2$ | 0.1 | 0.1 | 1 |  |  |
| $Fe_2O_3$ | 1.7 | 10.0 | 16 |  |  |
| FeO |  |  |  | 1 |  |
| Fe | 1.14 | 7.0 |  |  | 11 |
| Mn | 50.0 | 47.5 |  | 38 | 80 |
| MnO | 19.1 | 6.1 |  | 49 |  |
| $MnO_2$ | 55.6 | 67.6 |  |  |  |
| CaO | 0.0 |  |  | 3 | 3 |
| MgO | 0.0 |  |  | 2 | 2 |
| BaO | 1.7 |  |  |  | 4 |
| P | 0.17 | 0.09 |  |  |  |
| C |  |  |  |  | 7 |
| $H_2O$ combined | 6.0 | 5.0 |  |  |  |

The ash content of the coke gravel was on an average 20 per cent and its content of volatile constituents about 3 per cent calculated on the dry product.

If a charge as above stated is used as a basis for a material balance the amount of ferromanganese obtained is experimentally found to be 226 kg. By means of the analysis the slag amount is calculated to be 192 kg. (corresponding to 850 kg. slag per metric ton alloy obtained). Further the amount of manganese volatilized during the process is calculated to 2 per cent of the manganese content added with the charge. The amount of carbon for the reduction is calculated to 82 kg. The gas quantity in the form of carbon monoxide and carbon dioxide is easily calculated from the difference between the amount of oxygen supplied to the furnace with the charge and the amount leaving the same in the slag. By dispensing the amount of oxygen thus calculated on the amount of reduction carbon it is also easy to find out the proportion between carbon monoxide and carbon dioxide. Hereby it turns out that the content of carbon dioxide calculated on dry gases is 13 per cent and the content of carbon monoxide 85 per cent. Remaining 2 per cent are assumed to be oxygen leaving the furnace at the thermal dissociation of higher manganese oxides without reacting with the carbon monoxide.

The material consumption per ton high-carbon ferromanganese is summarized in the following table

| | |
|---|---|
| Ore "A" counted as dry | kg__ 1164 |
| Ore "B" counted as dry | kg__ 1190 |
| Coke-gravel counted dry | kg__ 530 |
| Electrode carbon counted | kg__ 20 |
| Power | kwh__ 2900 |

Products obtained

| | |
|---|---|
| High-carbon ferromanganese | kg__ 1000 |
| Slag | kg__ 850 |
| Manganese in gaseous form | kg__ 25 |
| Reduction gases (13% $CO_2$, 2% $O_2$, 85% CO) | m.³__ 690 |
| Evaporated water | kg__ 385 |

With the knowledge of the heat of formation of the different compounds in the charge in the slag and in the reduction gases the amount of heat which must necessarily be supplied for bringing about the desired reactions has been calculated. This necessary amount of heat is 2.10 million kcal. per ton of the high-carbon ferromanganese equal to 2440 kwh. per ton of the high-carbon ferromanganese.

Since the experimentally measured power consumption as above stated is 2900 kwh. per ton of the high-carbon ferromanganese the furnace, thus, at a theoretical consumption of 2440 kwh. per ton of the high-carbon ferromanganese has an efficiency of 84%, a very plausible figure for a furnace of the size in question. However, for the sake of clearness it must be pointed out that the theoretical figure includes heat content of all reaction products; otherwise the efficiency had become considerably lower.

The present invention has for its purpose to bring about a considerable decrease of the power consumption per ton alloy produced.

For this purpose the method according to the invention for the production of ferromanganese is substantially characterized thereby that the ore used as starting material is pre-reduced with a CO-containing gas to MnO in such a manner that the gas leaving the pre-reduction stage has substantially all of its CO-content oxidized to $CO_2$, after which the final reduction is carried out with carbon as reducing agent. By taking suitable measures regarding the construction and management of the furnace it is possible to obtain an exhaust gas from the pre-reduction zone being practically free from carbon monoxide. The carbon monoxide formed during the final reduction where MnO is directly reduced with carbon thereby may suitably be utilized as reduction agent in the pre-reduction, whereby it reacts exothermically with that oxygen which is relatively loosely combined in the higher manganese oxides thereby delivering a considerable heat quantity to the charge at the same time as the required amount of reduction carbon is decreased.

The most important measure for arriving at this result consists in distributing the carbon monoxide formed in the final reduction zone equally over the section of the furnace and in distributing the charging material in the same way over the furnace section, so that the gas will flow as closely to ideal countercurrent with the charge material as possible. It is also important that the furnace is so dimensioned that the gas flow will not become so rapid that the pre-reduction and the combustion of the carbon monoxide respectively become incomplete.

With the mode of operation of manganese furnaces hitherto utilized in the technic the final reduction takes place in a rather small zone around the electrode. The reduction gases formed then pass with a high speed along the electrode whereby the main part of the gas comes into contact only with a small part of the charge. The reduction of the manganese monoxide with solid carbon should if possible be spread out from the ends of the electrodes and be distributed as equally as possible over the cross section of the furnace. This desideratum may cause that it becomes necessary to leave the conventional types of ferro alloy furnaces where one or three electrodes are inserted vertically into a furnace crucible e. g. made from graphite and instead of that to use furnaces where the electrodes are inserted horizontally through the furnace walls. Another possibility of spreading the reduction zone is to utilize a furnace of the same type as is used in the electric smelting of glass and in which the main power transformation occurs due to resistance heating of the charge.

Another possibility for attaining the same result, i. e. a low carbon monoxide content in the gases leaving the furnace, consists in carrying out the final reduction in a common furnace of the closed type and supplying the carbon monoxide formed in this furnace to a special pre-reduction apparatus where the carbon monoxide is brought to reaction with the content of higher manganese oxides of the charge.

When the carbon monoxide reacts with that quantity of oxygen combined to manganese of normal manganese ores which surpasses one atom of oxygen per atom of manganese considerable heat quantities are liberated as has already been stated which heat, can bring about severe sinterings, when carrying out the reaction in counter current. In order to control the temperature prevailing in the charge in a countercurrent apparatus it proved advantageous to add basic slag-forming elements in the form of carbonates e. g. limestone or dolomite. The intermixing of carbon into the charge can take place before the pre-reduction or when the pre-reduced ore is charged into the final reduction furnace.

In order to explain the advantages to be gained by the above described simple features by which the carbon monoxide content of the exhaust gases is considerably decreased the following calculation has been made.

In this case in the same way as by calculating the conventional method we start from a charge of 280 kg. ore B. This ore quantity is smelted with coke gravel whereby the rich slag method is used so that the analysis of the slag becomes about the same as above stated. The quantity of coke gravel necessary is determined from the oxygen balance whereby, however, for the case of security it is presumed that the gases leaving the furnace contain 17% CO and 3% $O_2$ so that the carbon dioxide content consequently is 80%. It is theoretically possible to come down to practically 0% CO, but in practice it seems not to be possible to bring about the completely ideal countercurrent in the furnace. From the oxygen balance the amount of coke gravel is calculated to 81 kg. The alloy obtained from the quantity of ore stated, amounts to 232 kg. Below has been given a summary of the results of the material balance.

*Consumption of material per ton high-carbon ferromanganese*

| | | |
|---|---|---|
| Ore A calculated as dry | kg | 1134 |
| Ore B calculated as dry | kg | 1160 |
| Coke gravel calculated as dry | kg | 349 |
| Electrode carbon | kg | 20 |

*Products obtained*

| | | |
|---|---|---|
| Alloy with 80% manganese | kg | 1000 |
| Slag, 38% manganese | kg | 770 |
| Manganese in gaseous form | kg | 25 |
| Reduction gas (17% CO, 3% $O_2$, 80% $CO_2$) | m.³ | 425 |
| Evaporated water | kg | 376 |

On the basis of this material balance a heat balance has been made whereby it proved that the heat quantity to be added per ton of the high-carbon ferromanganese for permitting the reactions aimed at amounts to 1.48 million kcal.=1720 kwh. per ton of the high-carbon ferromanganese. If the electrical calories are supplied with the same efficiency i. e. 0.84, as in the preceding calculation, the power consumption amounts to 1720/0.84= 2050 kwh./ton of the high-carbon ferromanganese.

By the measures here suggested it is thus possible per ton alloy to save a power quantity of 850 kwh., i. e. 29% of the lowest power consumption hitherto calculated with and the power consumption will even pass considerably below the theoretical consumption of the method hitherto used in the production of ferromanganese.

We claim:
1. Process for the production of ferromanganese which comprises pre-reducing the $MnO_2$ content of a manganese ore to MnO by countercurrently contacting the ore with a gas containing substantially more than 20% of CO and less than 80% of $CO_2$ thereby producing a gas containing not more than 20% of CO and at least 80% of $CO_2$ and thereafter completing the reduction of the resulting MnO to the metallic state by means of carbon in an electric furnace thereby producing a gas containing substantially more than 20% of CO.

2. Process as defined in claim 1 in which the gas containing substantially more than 20% of CO produced in the reduction of MnO is used as the gas for the reduction of the $MnO_2$ to MnO.

3. Process as defined in claim 1 in which the ore is supplied in the form of a descending column, the CO-containing gas is uniformly distributed across the column and the rate of counter-current movement of the ore and the CO-containing gas is maintained sufficiently slow that the CO-content of the gas is reduced to below 20%.

4. Process as defined in claim 1 in which the reduction of the MnO is effected by means of horizontal graphite electrodes.

5. Process as defined in claim 1 in which the heat required for the reduction of the MnO is supplied principally by electrical resistance heating.

6. Process as defined in claim 1 in which the ore is mixed with basic slag forming materials in the form of carbonates.

7. Process as defined in claim 1 in which the ore is mixed with carbon and in which the pre-reduction is carried out at a temperature below that at which $CO_2$ reacts with carbon.

References Cited in the file of this patent

UNITED STATES PATENTS

| | | |
|---|---|---|
| 489,303 | Greene et al. | Jan. 3, 1893 |
| 2,461,442 | Pritz | Feb. 8, 1949 |

FOREIGN PATENTS

| | | |
|---|---|---|
| 18,945 | Great Britain | of 1910 |
| 419,144 | France | Aug. 10, 1910 |